Aug. 15, 1972  G. A. BARTHOLOMEW  3,684,539
METHOD OF ADDING OXYGEN CONTAINING METALLIC COMPOUNDS TO
A MOLTEN METALLURGICAL SLAG
Filed Dec. 10, 1969

INVENTOR
GEORGE A. BARTHOLOMEW
By Donald G. Dalton
Attorney

United States Patent Office 3,684,539
Patented Aug. 15, 1972

3,684,539
METHOD OF ADDING OXYGEN CONTAINING METALLIC COMPOUNDS TO A MOLTEN METALLURGICAL SLAG
George A. Bartholomew, 122 Yorkshire Road, Pittsburgh, Pa. 15238
Continuation-in-part of application Ser. No. 632,859, Feb. 21, 1967, which is a continuation-in-part of application Ser. No. 557,854, May 18, 1966, which in turn is a continuation-in-part of application Ser. No. 286,084, June 6, 1963. This application Dec. 10, 1969, Ser. No. 883,994
Int. Cl. C04b 7/14
U.S. Cl. 106—117                 8 Claims

ABSTRACT OF THE DISCLOSURE

A method of adding compounds containing metals and oxygen to molten metallurgical slag wherein the compounds carried in combustion oxygen are introduced beneath the surface of a body of molten slag and fuel is separately introduced into the slag with the fuel and oxygen completely burning beneath the slag to maintain it molten.

---

This application, which is a continuation-in-part of my co-pending application, Ser. No. 632,859, filed Feb. 21, 1967, now abandoned, which is a continuation-in-part of my co-pending application, Ser. No. 557,854, filed May 18, 1966, now abandoned, which in turn is a continuation-in-part of my abandoned application, Ser. No. 286,084, filed June 6, 1963, relates to a method of adding metallic compounds to slag, and more particularly to adding oxygen containing metallic compounds to metallurgical slags such as blast furnace and open hearth slags while they are in a molten condition. These metallic compounds will normally be in the form of naturally occurring minerals. Slag compositions have long been modified by adding materials thereto, especially in the manufacture of slag cements. This has been done in various ways such as by mechanical mixing or by passing a mixture of slag and additives through a rotary kiln in which they are heated to incipient fusion. Mechanical mixing has the disadvantage that the physical and chemical reactions of the constituents are slow and incomplete. Kiln burned slag products have more uniformity than raw mixtures, but the process is expensive because of the cost and inefficiency of the equipment required.

The operation of blast furnaces has also been modified to obtain a slag having the desired characteristics for cement use. This involves modifying the charge into the furnace and also varying the operation of the furnace in other respects. This has the disadvantage that it may not be possible to operate the furnace in the most efficient way to produce pig iron. Another disadvantage is that some slag alloying constituents cannot be charged into the furnace because of their effect on furnace linings or the like.

Additives have also been made to slag to make it more suitable for soil treatment. This may be done by mechanical mixing or by adding material to molten slag. The disadvantages of mechanical mixing are pointed out above. When material is added to molten slag the slag must be maintained molten for sufficient time to permit the desired physical and chemical reactions to occur, especially when the product to be obtained has a higher melting point than the slag.

It is therefore an object of my invention to provide a method of treating molten metallurgical slag by the addition of heat and oxygen containing metallic compounds thereto in such a manner that the desired compositions can be obtained.

Another object is to provide such a method which may be used to obtain a product having a melting point higher than that of the slag.

Figure 1:
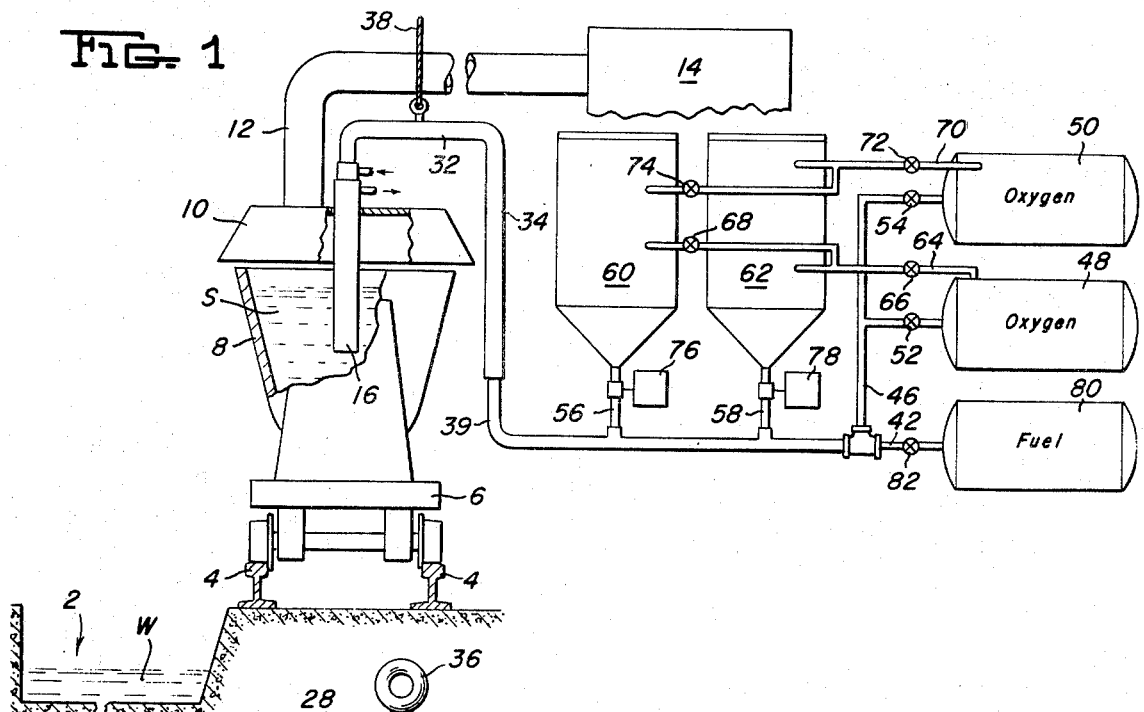
Figure 2:
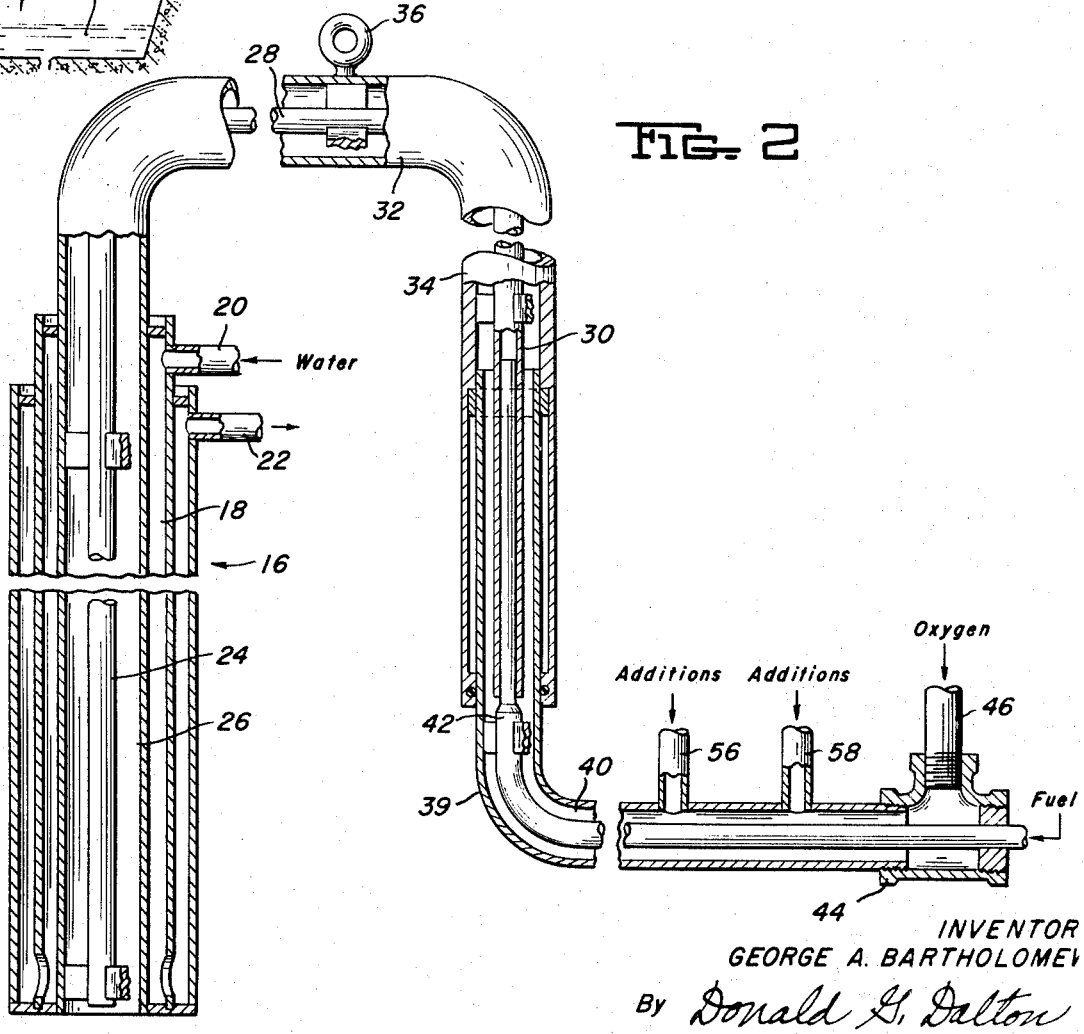

These and other objects will be more apparent after referring to the following specification and attached drawings, in which:

FIG. 1 is a schematic view, partly in section, showing apparatus used in the practice of my invention; and FIG. 2 is an enlarged view, partly in section, of the lance shown in FIG. 1.

Referring more particularly to the drawings, reference numeral 2 indicates a granulating pit having water W therein. A track 4 is provided adjacent the pit 2 for supporting a ladle car 6 having a ladle 8 mounted thereon for receiving molten metallurgical slag S. A hood 10 may be supported above the ladle 8 for receiving fumes and dust. The hood 10 is connected by means of a conduit 12 to a precipitator 14. One leg of a U-shaped lance 16 passes downwardly through the hood 10. The lance 16 includes a cooling chamber 18 through which water is circulated from an inlet 20 to an outlet 22. The lance 16 also includes fuel conduit 24 and an oxygen and additive conduit 26. The conduit 24 extends upwardly to a horizontal portion 28 to which is attached a downwardly extending leg 30. The conduit 26 has a horizontal portion 32 and a downwardly extending leg 34 surrounding the leg 30. The conduits 24 and 26 are arranged coaxially. An eye 36 is attached to the horizontal portion 32 for receiving a wire rope 38 which may be attached to a crane or other lifting device, not shown.

A double conduit 39 is slidably received within the leg 34. The conduit 39 has an outer chamber or conduit 40 which is connected to the conduit 26 and an inner chamber or conduit 42 which is connected to the conduit 24. Conduit 40 is connected to a T 44. A conduit 46 is attached to the side outlet of the T 44 and leads to two oxygen containers 48 and 50 which contain oxygen under pressure. It will be understood that the gas in containers 48 and 50 may be commercially pure oxygen, air or a mixture of air and commercially pure oxygen. It will be in this sense that the term combustion oxygen will be used hereinafter and in the claims. Valve 52 controls the flow of combustion oxygen from tank 48 and a valve 54 the flow from tank 50. Outlets 56 and 58 from conduit 40 lead to pressurized storage tanks 60 and 62, respectively. These tanks contain additive components of the desired type. A conduit 64 leads from tank 48 to tanks 60 and 62, valves 66 and 68 being provided therein to control the flow of combustion oxygen. A similar conduit 70 leads from tank 50 to tanks 60 and 62 with valves 72 and 74 being provided to control the flow of combustion oxygen to these tanks. Metering valves 76 and 78 are provided in the conduits 56 and 58, respectively, to control the flow of material from the tanks 60 and 62. Conduit 42 extends through T 44 to a fuel tank 80, a valve 82 being provided to control the flow of fuel.

In carrying out my invention the tanks 60 and 62 are filled with the desired components. I have found that these components must contain oxygen since slag is a solvent of oxygen containing components and hence such components will go into solution readily and combine with the oxides in the molten slag. Slag consists of a mixture of simple and complex ions, the exact configuration of which is not known. This is especially true in its amorphous condition when molten. It is known, however, that it contains some compounds in solution with other compounds and some compounds merely physically mixed with other compounds. The additives are in granular form and should be of such size that all particles will pass through a No. 4 mesh sieve. Preferably the particles should be more finely graded so that 95% thereof will pass a 20 mesh sieve and 35% pass a 100 mesh sieve. A ladle 8 is positioned beneath the hood 10 and the lance 16 is lowered so that its end is below the level of the molten slag S and the valves 52, 54, 66, 68, 72, 74, 76, 78 and 82 adjusted so as to provide the desired amount of fuel, combustion oxygen and additives. The fuel and combustion oxygen are kept separate until they exit from the bottom of the lance 16. The fuel and combustion oxygen will combine and burn within the molten mass with the heat increasing the temperature and fluidity of the slag at a localized location, thus facilitating the escape of gaseous materials and efficiently degassing the slag. I have found that by providing sufficient oxygen for complete combustion or oxidization of the combustibles in the fuel and effectively mixing the oxygen with the fuel to burn all the fuel to $CO_2$ and $H_2O$, the added compound will go into solution rather than separating from the slag matrix. A non-reducing mixture of gases at a temperature above the melting point of the slag is obtained at a localized location. To insure complete combustion it is preferred to provide more than the stoichiometric amount of oxygen and to obtain a slightly oxidizing mixture of gases in the slag. While it is preferred not to add more than 10% excess oxygen, additional amounts will not cause the additives to segregate from the slag matrix. Since the lance nozzle is submerged in the molten mass the heat is transferred rapidly and efficiently to the slag and there will be thorough mechanical and thermal mixing of the mass. Since the mineral additives are introduced through the flame, they are liquified and dispersed into the hottest portion of the mass and the physical and chemical reactions between the components will be rapid and thorough. This method also enables the dissolving of additives having melting points higher than that of the slag. After the desired additions have been made the lance 16 is raised and the molten slag is preferably dumped into the water W so as to quench it rapidly to an amorphous glassy state, thus maintaining the amorphous solution of the solute in the metallurgical slag in a solid state. In order to insure that the product be in the form of a solution rather than af used or sintered mixture, the cooling should be at a rate of at least 500° F. per minute until it solidifies. In some cases it will be advantageous to cool the slag slowly to a crystallized state. To do this the water is removed from the pit 2 before dumping the slag. The velocity of the fuel, the combustion oxygen and the additives may be varied. When adding small amounts of low melting point additives and using tar as the fuel, proper mixing will occur with a gas velocity as low as 20 ft. per second. When adding large amounts of higher melting point additives and using a gaseous fuel the gas velocity may be as high as 1500 ft. per second. In most cases, however, the velocity would be between 100 and 500 ft. per second.

When preparing a soil treatment composition the method may be carried out in the following manner. Assuming that there is 12.22 tons of steel producing open hearth slag in molten condition in the ladle 8, granulated rock phosphate $(Ca_3(PO_4)_2)$ in the tank 62, granulated potash $(K_2O)$ in the tank 60, natural gas in the tank 80 and air under pressure in the tanks 48 and 50, 20 tons of the soil treatment composition can be obtained as follows: The valve 78 is set to remain open until 6.11 tons of rock phosphate is fed into the ladle 8 and the valve 76 set to remain open until 1.67 tons of potash is delivered to the ladle 8. Natural gas and air will be delivered to the lance 16 as described above to supply sufficient heat to keep the mixture in the ladle 8 molten. Since the composition has a lower melting point than the slag, part of the heat necessary to keep the mixture molten will be provided by the slag while the remaining heat will be supplied by burning of the natural gas. When the desired amount of phosphate and potash has been fed natural gas will continue being burned for the period of two to twenty minutes, the period of time sufficient to complete the physical and chemical reactions. The lance 16 is then removed and the slag dumped into the water W.

This provides a composition having approximately 10% available phosphate and 5% available potash. Because of the intimate and rapid mixing, the resulting homogeneous product has the various components uniformly distributed throughout its mass as compared to products produced by other methods wherein the components are distributed in a non-uniform manner to produce heterogeneous inclusions.

When preparing portland cement the method may be carried out in the following manner. Assuming that there are 10 tons of molten slag from an iron producing blast furnace in the ladle 8, granular lime (CaO) or limestone $(CaCO_3)$ in the tank 62, oxygen in the tanks 48 and 50 and fuel oil in the tank 80, approximately fifteen tons of portland cement can be obtained as follows: The valve 78 is set to remain open until 5 tons of lime (CaO) is delivered to the ladle 8. Fuel oil and oxygen will be delivered to the lance 16 as described above to supply sufficient heat to keep the mixture in the ladle 8 molten. Since the composition has a higher melting point than the slag more heat must be supplied than when making the soil treatment composition described above. When the desired amount of lime has been fed, the heat will continue to be supplied by the burning of the fuel for a period to complete the physical and chemical reactions. The lance 16 is then removed and the slag dumped into the trough 2 which may or may not have water therein. Assuming that a blast furnace slag consisting of 45% CaO, 32% $SiO_2$, 10% $Al_2O_3$, 6% MgO and 2% $Fe_2O_3$, the modified slag will consist of 64.2% CaO, 21.6% SiO, 6.8% $Al_2O_3$, 4% MgO and 1.4% $Fe_2O_3$. The modified slag is then ground to size to provide portland cement of an analysis within the limits specified.

Thermal glass may be made from blast furnace slag in the following manner: Molten slag containing 37.4% CaO, 34.0% $SiO_2$, 12.6% $Al_2O_3$ and 13.3% MgO has sand $(SiO_2)$, razorite $(Na_2\ 0.2\ B_2O_3)$ and soda ash $(Na_2CO_3)$ added to it in the same manner as in the other examples. Mixing 820 lbs. of slag, 900 lbs. of sand, 110 lbs. of borax and 308 of soda ash produces 2,000 lbs. of glass containing 15.3% CaO, 59.2% $SiO_2$, 4.8% $Al_2O_3$, 5.6% MgO, 3.8% $B_2O_3$ and 11% $Na_2O$, all percentages being by weight. It will be noted that this method requires a third tank since three components are being added, but the method is otherwise the same as described above. After the physical and chemical reactions are completed the glass may be treated or fiberized in the usual manner.

Micronutrient frit may be made from slag produced in an oxygen steel making plant in the following manner: To 1,575 lbs. of slag containing 19.2% iron, 4% manganese and 1.9% magnesium is added 280 lbs. of razorite $(Na_2\ 0.2\ B_2O_3)$, 45 lbs. of cuprous oxide $(Cu_2O)$ and 100 lbs. of zinc oxide (ZnO). The process is carried out in the manner set forth above to produce a product containing 3% boron, 2% copper, 4% zinc, 15% iron, 3% manganese and 1.5% magnesium. The molten mixture is quenched after the physical and chemical reactions are completed to obtain a solid solution.

My process requires that the additive, which may be any compound containing metal and oxygen be introduced along with the combustion oxygen into molten slag, that the fuel be introduced separately adjacent the combustion oxygen, and that the fuel and oxygen completely burn to obtain a non-reducing mixture of gases and make the additive molten and to maintain the mixture molten until the physical and chemical reactions are completed. No novelty is claimed in the specific chemical reactions and it is not even certain what chemical compounds are formed. It will be understood that introducing relatively cold additives into molten slag will lower the temperature of the mixture. By adding heat as described the additive is melted and additional heat added to maintain the mixture molten at least where the physical and chemical reactions take place and preferably throughout. It is preferred that the process be utilized with aluminum, arsenic, baruim, boron, calcium, chrominum, cobalt, copper, iron, lead, magnesium, manganese, molybdenum, nickel, phosphorous, potassium, silicon, sodium, titanium, uranium, zinc and zirconium combined as oxides or with oxygen containing anions of carbon, sulfur, silicon, aluminum, chromium, phosphorus and boron.

It will be understood that there will be more demand for some of the additives than for others and it is preferred, as a matter of economics, to use compounds which appear in nature as minerals even though they may contain other ingredients. In addition to the compounds mentioned in the examples given above, compounds which may be added include $Co_2O_3 \cdot CoO$, $Fe_2O_3$, $PbO$, $MoO_3$, $MnO_2$, $TiO_2$, $As_2O_3$, $BaSO_4$, $NiO$, $UO_2$, $3Al_2O \cdot 3SiO_2$, $Al_2O_2$, $FeCrO_4$, $ZnSiO_4$, $2PbCO_3 \cdot Pb(OH)_2$, $CaMg(CO_3)_2$, $PbMoO_4$ and $K_2CO_3$. The resulting product may be used as cement, fertilizer, glass, frit, or other common uses of slag. The additives enhance the physical and/or chemical properties of the product or in some instances are merely added for identification purposes. While the added compound may be as high as 60% by weight of the final mixture in most cases it will be less than 50%.

While several embodiments of my invention have been shown and described, it will be apparent that other adaptations and modifications may be made without departing from the scope of the following claims:

1. The method of adding metallic compounds to a molten metallurgical slag which comprises providing a container having molten metallurgical slag therein, introducing fuel into said metallurgical slag beneath the surface thereof at a velocity between 20 and 1500 ft. per second, separately introducing combustion oxygen into said metallurgical slag beneath the surface thereof closely adjacent to said fuel in a sufficient amount to completely oxidize the combustibles in the fuel, mixing and burning all of said fuel within said slag to obtain a flame and a nonreducing mixture of gases at a temperature above the melting point of the slag, introducing compounds containing metal and oxygen in granular form beneath the surface of said slag along with the combustion oxygen, said metal being of the class consisting of aluminum, arsenic, barium, boron, calcium, chromium, cobalt, copper, iron, lead, magnesium, manganese, molybdenum, nickel, phosphorus, potassium, silicon, sodium, titanium, uranium, zinc and zirconium, substantially liquifying said compounds by injection into the molten slag through said flame, discontinuing feeding of said compounds and then continuing introduction and burning of said fuel and combustion oxygen for a period of at least two minutes to maintain said slag molten so as to obtain a substantially homogeneous mixture of said slag and added metal compounds.

2. The method of claim 1 in which the slag is a ferrous metallurgical slag, and said metals are combined as oxides.

3. The method of claim 1 in which the oxygen in said compounds is combined as an anion with an element of the class consisting of carbon, sulfur, silicon, aluminum, chromium, phosphorous and boron.

4. The method of claim 1 in which the metal compounds are minerals.

5. The method of claim 4 in which the mineral is of the class consisting of rock phosphate, potash, lime, sand, razorite, cuprite, zincite, dolomite, feldspar, alumina and soda ash.

6. The method of claim 1 including the steps of removing said slag from its container after the desired composition is contained, and rapidly cooling the slag to maintain the additive in solution in the slag.

7. The method of claim 1 in which the slag is a ferrous metallurgical slag, and the metal is of the class consisting of aluminum, arsenic, barium, boron, calcium, chromium, cobalt, copper, iron, lead, maganesium, manganese, molybdenum, nickel, phosphorous, potassium, silicon, sodium, titanium, uranium, zinc, and zirconium.

8. The method of claim 5 in which the combustion oxygen surrounds the fuel, and the introduced granular compounds are of such size as to pass through a No. 4 mesh screen.

References Cited
UNITED STATES PATENTS

| | | |
|---|---|---|
| 397,373 | 2/1889 | Lesley. |
| 714,331 | 11/1902 | Reese. |
| 1,004,380 | 9/1911 | Daher. |
| 1,043,371 | 11/1912 | Sundberg. |
| 1,414,991 | 5/1922 | Welch. |
| 1,932,656 | 10/1933 | Fleming et al. |
| 2,471,562 | 5/1949 | Pitterer. |
| 2,986,458 | 5/1961 | Johnson. |

FOREIGN PATENTS

| | | |
|---|---|---|
| 653,150 | 11/1962 | Canada. |
| 16,704 | 10/1934 | Australia. |

TOBIAS E. LEVOW, Primary Examiner

W. T. SCOTT, Assistant Examiner

U.S. Cl. X.R.

106—51, 103; 75—24, 30, 41, 51; 71—31